US012373550B2

(12) United States Patent
Prochazka et al.

(10) Patent No.: US 12,373,550 B2
(45) Date of Patent: Jul. 29, 2025

(54) CROSS-DOMAIN INDICATOR OF COMPROMISE (IOC) IDENTIFICATION

(71) Applicant: Cisco Technology, Inc., San Jose, CA (US)

(72) Inventors: Pavel Prochazka, Horomerice (CZ); Stepan Dvorak, Podebrady (CZ); Lukas Bajer, Liberec (CZ); Martin Kopp, Komarov (CZ); Kyrylo Shcherbin, Prague (CZ)

(73) Assignee: Cisco Technology, Inc., San Jose, CA (US)

( * ) Notice: Subject to any disclaimer, the term of this patent is extended or adjusted under 35 U.S.C. 154(b) by 365 days.

(21) Appl. No.: 17/847,829

(22) Filed: Jun. 23, 2022

(65) Prior Publication Data

US 2023/0281300 A1    Sep. 7, 2023

Related U.S. Application Data

(60) Provisional application No. 63/316,513, filed on Mar. 4, 2022.

(51) Int. Cl.
*G06F 21/55* (2013.01)
(52) U.S. Cl.
CPC ........ *G06F 21/55* (2013.01); *G06F 2221/034* (2013.01)
(58) Field of Classification Search
CPC ............................ G06F 21/55; G06F 2221/034
See application file for complete search history.

(56) References Cited

U.S. PATENT DOCUMENTS

| 2016/0021141 | A1 | 1/2016 | Liu et al. |
| 2018/0048667 | A1* | 2/2018 | Tang ................... H04L 63/1416 |
| 2018/0159878 | A1* | 6/2018 | Lai ....................... H04L 63/1408 |
| 2018/0198805 | A1 | 7/2018 | Vejman et al. |
| 2019/0028508 | A1* | 1/2019 | Jeng ....................... H04L 43/16 |
| 2019/0132344 | A1 | 5/2019 | Lem et al. |
| 2019/0182273 | A1 | 6/2019 | Walsh et al. |
| 2020/0401696 | A1* | 12/2020 | Ringlein ................ G06F 21/552 |
| 2022/0129764 | A1* | 4/2022 | Ikeda ........................ G06N 5/01 |

OTHER PUBLICATIONS

Jusko, Jan, et al., "Cross-Dataset Malicious Actors Identification," Technical Disclousre Commons, Defensive Publications Series, https://www.tdcommons.org/, Feb. 20, 2019, 6 pages.

* cited by examiner

*Primary Examiner* — Sangseok Park
(74) *Attorney, Agent, or Firm* — Lee & Hayes, P.C.

(57) ABSTRACT

Techniques for identifying malicious actors across datasets of different origin. The techniques may include receiving input data indicative of network interactions between entities and modalities. Based at least in part on the input data, a maliciousness score associated with a first entity may be determined. In some instances, a value of the maliciousness score may be partially based on a number of the modalities that are interacting with the first entity and also interacting with one or more malicious entities. The techniques may further include determining whether the value of the maliciousness score exceeds a threshold value and, based at least in part on the value of the maliciousness score exceeding the threshold value, a request may be made to identify the first entity as a new malicious entity.

20 Claims, 7 Drawing Sheets

CROSS-DOMAIN INDICATOR OF COMPROMISE (IOC) IDENTIFICATION

RELATED APPLICATIONS

This application claims priority to U.S. Provisional Application No. 63/316,513, filed on Mar. 4, 2022, which is incorporated herein by reference in its entirety and for all purposes.

TECHNICAL FIELD

The present disclosure relates generally to techniques for identifying malicious actors and other entities across datasets of different origin. The techniques may be used to, among other things, convict malicious entities observed in network traffic and identify command-and-control infrastructure associated with newly detected malware even if no direct communication between directly observed entities, for example binaries and domains, is observed.

BACKGROUND

The network and client infrastructure that is used for operating command-and-control (C&C) attacks and other high-impact cyber threats are known to be short-lived because malicious actors are forced to vary these entities quickly when found and published by the cyber community or security industry. The entities are described by the indicators of compromise (IoC's) such as domains (e.g., fully qualified domain names), internet protocol (IP) addresses, uniform resource locator (URL) addresses, or hashes of binaries. Maintaining a reliable list of malicious network entities in their active phase is critical for the efficacy of any intrusion detection system. Since each candidate entity must be human reviewed prior to adding a specific candidate entity to the list of malicious network entities, only a very limited number of candidate entities can be processed.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes techniques for identifying malicious actors and other entities across datasets of different origin, which may be used to, among other things, convict malicious network traffic and identify command-and-control infrastructure of newly detected malware even if no direct communication between two different entities, e.g., binaries and domains, is observed. By way of example, and not limitation, a method according to the technologies described herein may include receiving input data indicative of network interactions between entities and modalities. Based at least in part on the input data, a maliciousness score associated with a first entity may be determined. In some examples, a value of the maliciousness score may be based at least in part on a number of the modalities that are interacting with the first entity and also interacting with one or more malicious entities. The method may also include determining whether the value of the maliciousness score exceeds a threshold value. In some instances, if the maliciousness score exceeds the threshold value, a report associated with the first entity may be generated. The report may include the value of the maliciousness score, a request to identify the first entity as a new malicious entity, and/or the like.

Additionally, the techniques described herein may be performed as a method and/or by a system having non-transitory computer-readable media storing computer-executable instructions that, when executed by one or more processors, performs the techniques described above.

EXAMPLE EMBODIMENTS

This application describes techniques for identifying malicious actors and other entities across datasets of different origin. The techniques may be used to, among other things, convict malicious network traffic and identify command-and-control infrastructure of newly detected malware even if no direct communication between two different entities, e.g., binaries and domains, is observed. The disclosed techniques provide for a scalable IoC retrieval algorithm that has a low computational cost and provides a very accurate retrieval of high-risk malicious entities. On top of that, the retrieved entities may be supported with an understandable explanation of why they were selected. This explanation can increase throughput during a confirmation phase since it provides valuable additional evidence supporting the decision.

In some examples, the techniques described herein may leverage interaction of a main entity (e.g., domain) with other modalities (e.g., IP addresses, user nodes, client devices, servers, etc.) extracted from telemetry data associated with an intrusion detection system (IDS) or intrusion prevention system (IPS). In some examples, a bipartite graph may be composed for each modality, and the bipartite graph may be formed by main entities (e.g., domain nodes), entities of a given modality (e.g., server IP addresses, user nodes, etc.) and edges reflecting the fact that the connected nodes occurred in one log event (e.g., a user visited a domain, a modality interacted with an entity, etc.). Based at least in part on a given bipartite graph, any modalities interacting with known malicious entities may be identified and a maliciousness score may be calculated or otherwise determined for the modality. The maliciousness scores of all modalities interacting with a candidate entity may then be aggregated to determine a maliciousness vector for the candidate entity, where each dimension of the vector corresponds to the candidate entity maliciousness based on a given modality. The final maliciousness score for an entity may then be calculated or otherwise determined based on another aggregation over the maliciousness vector. In some examples, all of the candidate entities of the bipartite graph may be sorted by their final maliciousness score, and a selection of the highest at-risk entities may be selected for a confirmation stage. Additionally, or alternatively, in some examples an explanation of the maliciousness score and how it was determined for each candidate entity may be given by a decision-relevant subgraph.

By way of example, and not limitation, a method according to the techniques described herein may include receiving input data indicative of network interactions between entities and modalities. In some examples, the input data may be transformed into a bipartite graph that is determined based at least in part on telemetry data associated with an intrusion detection system. The bipartite graph may describe or otherwise be indicative of interactions between one or more entities (e.g., domains) and one or more modalities (e.g., users or IPs). For example, the bipartite graph may include a first set of vertices representing the entities (including both candidate entities and known, malicious entities), a second set of vertices representing the modalities, and multiple edges connecting individual vertices of the first set of vertices with respective vertices of the second set of vertices. In some instances, the multiple edges may represent current or prior interactions between the entities and the modalities.

In some examples, the method may include determining a maliciousness score for each of the candidate entities based at least in part on the input data. In some examples, a value of a maliciousness score for a specific candidate entity may be based at least in part on a number of the modalities that are interacting with the specific candidate entity, and which are also interacting with one or more known, malicious entities. For example, in some instances respective maliciousness scores associated with each one of the modalities may be determined. In some examples, for each of the respective modalities, a value of their respective maliciousness score may be equal to a number of known, malicious entities that the respective modality is interacting with divided by a total number of the entities that the respective modality is interacting with. By way of example, and not limitation, if a first modality is interacting with a total of four entities, and one of the four entities is a known, malicious entity, then the value of the maliciousness score for that first modality may be equal to ¼ (or 0.25). Additionally, in some examples, the maliciousness score associated with the specific candidate entity may be determined based at least in part on an aggregation of the respective maliciousness scores associated with each one of the modalities that are interacting with the specific candidate entity. Continuing the above example, if the specific candidate entity is interacting with the first modality (maliciousness score value of ¼ (or 0.25) and with a second modality that has a maliciousness score value of ½ (or 0.5), then the maliciousness score value for the specific candidate entity may be equal to the average of ¼ and ½ (which is equal to ⅜ (or 0.375).

In some examples, the method may include determining whether the value of the maliciousness score for the specific candidate entity exceeds a threshold value. In some instances, the threshold value may be a specific value set by a threat analyst, such as 0.3, 0.4, 0.6, etc. In some examples a maliciousness rank of the specific candidate entity relative to other candidate entities may be determined based at least in part on the value of the maliciousness score, and whether the value of the maliciousness score exceeds the threshold value may be based at least in part on the maliciousness rank of the specific candidate entity. For instance, if the specific candidate entity is within a top ten of candidate entities with a highest maliciousness ranking, then the threshold value may be determined as the maliciousness score value corresponding to the tenth ranked entity.

In some examples, if the value of the maliciousness score exceeds the threshold value, a report associated with the first entity may be generated. In some examples, the report may be sent to a threat analyst associated with a network who validates the actual maliciousness of the candidate entities. In some examples, the report may include the value of the maliciousness score associated with the specific candidate entity and a request to identify (e.g., classify, label, categorize, etc.) the specific candidate entity as a new malicious entity. Additionally, or alternatively, the report may include an indication of the one or more malicious entities that the modalities have interacted with in addition to the specific candidate entity. Additionally, or alternatively, the report further may include a maliciousness vector associated with the specific candidate entity, the maliciousness vector including respective maliciousness scores associated with each one of the modalities that are interacting with the specific candidate entity. In addition, or in the alternative, to the examples above, the report may also include one or more of: (i) a maliciousness score (e.g., reputation) for each modality (e.g., IPs, files, users, etc.) interacting with the specific candidate entity; (ii) an aggregated score over the maliciousness vector (i.e., over different data sources) for each entity (e.g., domain); (iii) an ordering of both entities and modalities by their maliciousness score; and/or (iv) supporting information providing the reasoning for the maliciousness score, which may contain a subgraph of the bipartite graph indicating the neighbors for each entity or modality node and/or full information for the maliciousness score computation for a given candidate entity.

The techniques described herein provide for several improvements in computer-related technology in the field of threat detections and malware identification. For instance, the disclosed techniques provide for a scalable IoC retrieval algorithm that has a low computational cost. Additionally, the techniques provide a very accurate retrieval of high-risk malicious entities. On top of that, the retrieved entities may be supported with an understandable explanation of why they were selected. This explanation can increase throughput during a confirmation phase (which may be either manual or automated) since it provides valuable additional evidence supporting the decision. Other improvements will be readily apparent to those having ordinary skill in the art.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
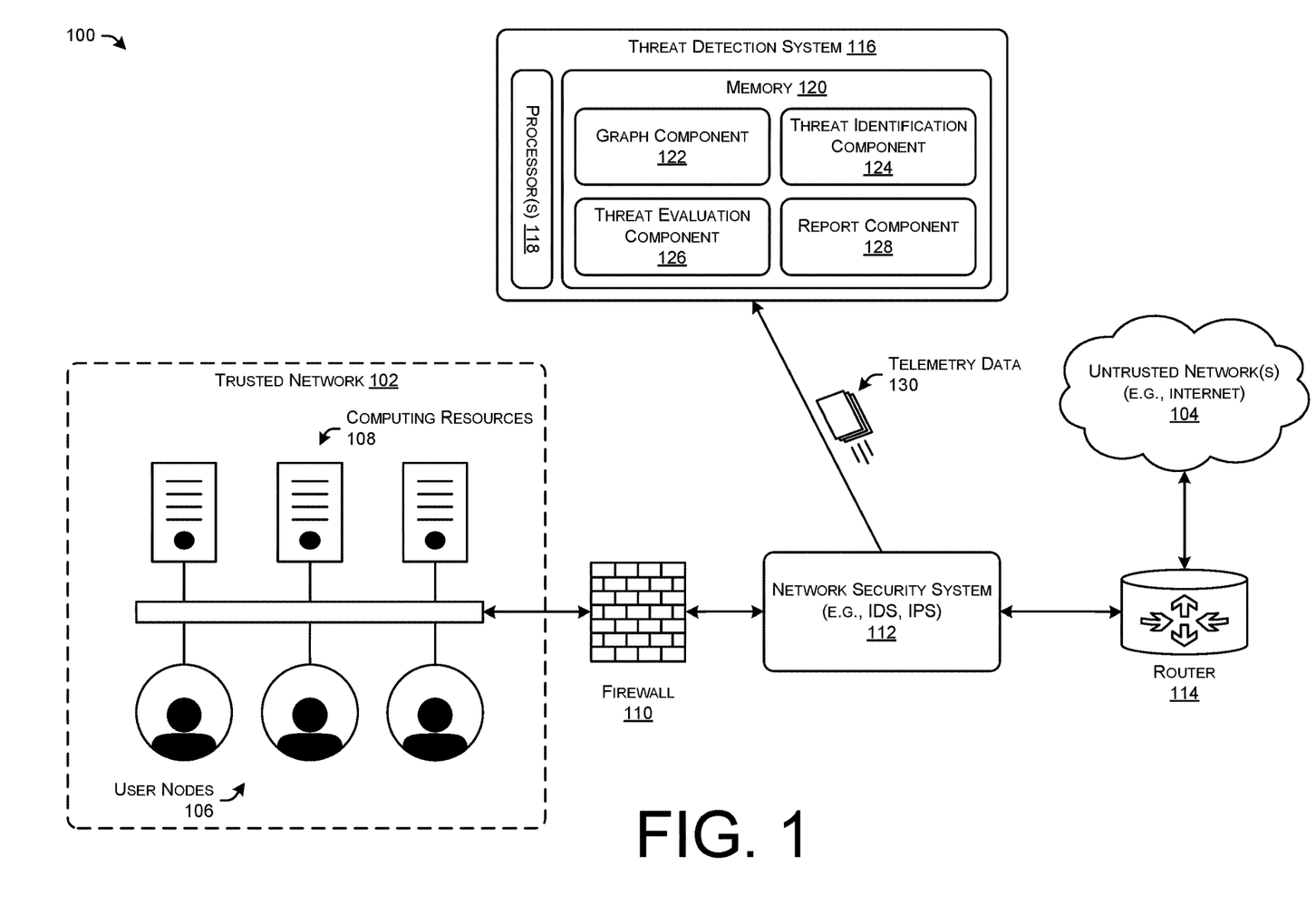
FIG. 1 illustrates an example architecture that may be used to implement various aspects of the threat detection techniques described herein.

FIG. 1 illustrates an example architecture 100 that may be used to implement various aspects of the threat detection techniques described herein. The architecture 100 may include, in some examples, a trusted network 102 that has access to one or more untrusted network(s) 104, such as the internet. For instance, one or more user nodes 106 and/or computing resources 108 of the trusted network 102 may be accessing entities (e.g., domains) over the one or more untrusted network(s) 104. As an example, a user associated with one of the user nodes 106 may be visiting a webpage on the internet, which is outside of the trusted network 102.

In some examples, when traffic is sent between the trusted network 102 and the one or more untrusted network(s) 104, the traffic may pass through a firewall 110, a network security system 112, and/or a router 114 (e.g., edge router). In some examples, the ordering in which traffic is passed through the firewall 110, the network security system 112, and/or the router 114 may be different than what is illustrated in FIG. 1. For example, the network security system 112 may alternatively be topologically located on the trusted network 102 side of the firewall 110 (e.g., between the firewall 110 and the trusted network 102). Additionally, one or more of the firewalls 110, the network security system 112, and/or the router 114 may be omitted from the packet path, in some examples.

In some examples, the firewall 110 may monitor incoming and outgoing traffic of the trusted network 102 and decide whether to allow or block specific traffic based on a defined set of security rules. In this way, the firewall 110 may establish a barrier between any secured and controlled internal networks of the trusted network 102 and the one or more untrusted network(s) 104, such as the Internet, other company networks, or the like. In some instances, the firewall 110 can be a standalone hardware device, software, or both.

In some examples, the network security system 112 may be an intrusion detection system (IDS), an intrusion prevention system (IPS), a combination of both, or the like. In some examples, the network security system 112 may continuously monitor incoming/outgoing traffic of the trusted network 102 for malicious activity and, in some examples, take action to prevent malicious activity when it does occur. In some examples, the network security system 112 may detect malicious activity and alert an administrator of the trusted network 102. In various examples, the network security system 112 may filter through a high volume of traffic (e.g., packets) without slowing down network performance.

The architecture 100 also includes a threat detection system 116, which may include components and functionality for performing many of the technologies disclosed herein for cross-domain IoC identification. The threat detection system 116 may include one or more processor(s) 118 and memory 120, which may be communicatively coupled to the one or more processor(s) 118. The memory 120 of the threat detection system 116 may be in the form of non-transitory computer-readable media storing instructions that, when executed by the one or more processor(s) 118, cause the one or more processor(s) 118 to perform the various operations disclosed herein. In some examples, the memory 120 of the threat detection system 116 may store a graph component 122, a threat identification component 124, a threat evaluation component 126, and a report component 128.

In some examples, the threat detection system 116 may receive telemetry data 130 from the network security system 112. The telemetry data 130 may be indicative of interactions between modalities (e.g., user nodes 106 and/or computing resources 108) of the trusted network 102 and entities (e.g., domains) of the untrusted network(s) 104. For instance, the telemetry data 130 may indicate that a user associated with one of the user nodes 106 visited a webpage (e.g., domain) on the internet. As another example, the telemetry data 130 may indicate that an IP address associated with one of the computing resources 108 interacted with a domain via the untrusted network(s) 104.

In some examples, the graph component 122 may include functionality for generating a bipartite graph based at least in part on the telemetry data 130 associated with the network security system 112. In some examples, a bipartite graph determined by the graph component 122 may describe or otherwise be indicative of interactions between one or more entities (e.g., domains) and one or more modalities (e.g., users or IPs). For example, the bipartite graph may include a first set of vertices representing the entities (including both candidate entities and known, malicious entities), a second set of vertices representing the modalities, and multiple edges connecting individual vertices of the first set of vertices with respective vertices of the second set of vertices. In some instances, the multiple edges may represent current or prior interactions between the entities and the modalities.

In some examples, the threat identification component 124 may include functionality for identifying one or more candidate entities (e.g., domains) of the untrusted network(s) that may be malicious. To do this, in some instances, the threat identification component 124 may determine maliciousness scores for the candidate entities based at least in part on the telemetry data 130 or a bipartite graph. In some examples, a value of a maliciousness score for a specific candidate entity may be based at least in part on a number of the user nodes 106 and/or computing resources 108 that are interacting with the specific candidate entity, and which are also interacting with one or more known, malicious entities. For example, the threat identification component 124 may, in some instances, calculate respective maliciousness scores associated with each one of the user nodes 106 and/or computing resources 108 may be determined. In some examples, for each of the respective user nodes 106 and/or computing resources 108, a value of their respective maliciousness score may be equal to a number of known, malicious entities that the respective user node 106 or computing resource 108 is interacting with divided by a total number of the entities that the respective user node 106 or computing resource 108 is interacting with. By way of example, and not limitation, if a first user node 106 is interacting with a total of four entities, and one of the four entities is a known, malicious entity, then the value of the maliciousness score for that first user node 106 may be equal to ¼ (or 0.25). Additionally, in some examples, the maliciousness score associated with the specific candidate entity may be determined by the threat identification component 124 based at least in part on an aggregation of the respective maliciousness scores associated with each one of the modalities that are interacting with the specific candidate entity. Continuing the above example, if the specific candidate entity is interacting with the first user node 106 (maliciousness score value of ¼ (or 0.25) and with a second user node 106 that has a maliciousness score value of ½ (or 0.5), then the maliciousness score value for the specific candidate entity may be equal to the average of ¼ and ½ (which is equal to ⅜ (or 0.375).

In some examples, the threat evaluation component 126 may include functionality for evaluating whether a candidate entity is malicious or not. For example, the threat evaluation component 126 may determine whether a value of a maliciousness score for a specific candidate entity exceeds a threshold value. In some instances, the threshold value may be a specific value set by a threat analyst, such as 0.3, 0.4, 0.6, etc. In some examples, the threat evaluation component 126 may determine a maliciousness rank of a specific candidate entity relative to other candidate entities based at least in part on the value of the maliciousness score, and whether the value of the maliciousness score exceeds the threshold value may be based at least in part on the maliciousness rank of the specific candidate entity. For instance, if the specific candidate entity is within a top ten of candidate entities with a highest maliciousness ranking, then the threshold value may be determined as the maliciousness score value corresponding to the tenth ranked entity.

In some examples, the report component 128 may include functionality for generating a report associated with entities that are likely to be malicious (e.g., entities in which the value of their maliciousness score exceeds the threshold value). In some examples, the report component may provide the report to a threat validating the actual maliciousness of the candidate entities within or outside the trusted network 102. In some examples, a report may include, among other things: (i) a value of a maliciousness score associated with a specific candidate entity; (ii) a request to identify (e.g., classify, label, categorize, etc.) the specific candidate entity as a new malicious entity; (iii) an indication of one or more malicious entities that the user nodes 106 and/or the computing resources 108 have interacted with in addition to the specific candidate entity; (iv) a maliciousness vector associated with the specific candidate entity (which may include respective maliciousness scores associated with each one of the modalities that are interacting with the specific candidate entity); (v) a maliciousness score (e.g., reputation) for each modality (e.g., IPs, files, users, etc.) interacting with the specific candidate entity; (vi) an aggregated score over the maliciousness vector (i.e., over different data sources) for each entity (e.g., domain); (vii) an ordering of both entities and modalities by their maliciousness score; and/or (viii) supporting information providing the reasoning for the maliciousness score, which may contain a subgraph of the bipartite graph indicating the neighbors for each entity or modality node and/or full information for the maliciousness score computation for a given candidate entity.

Figure 2A:
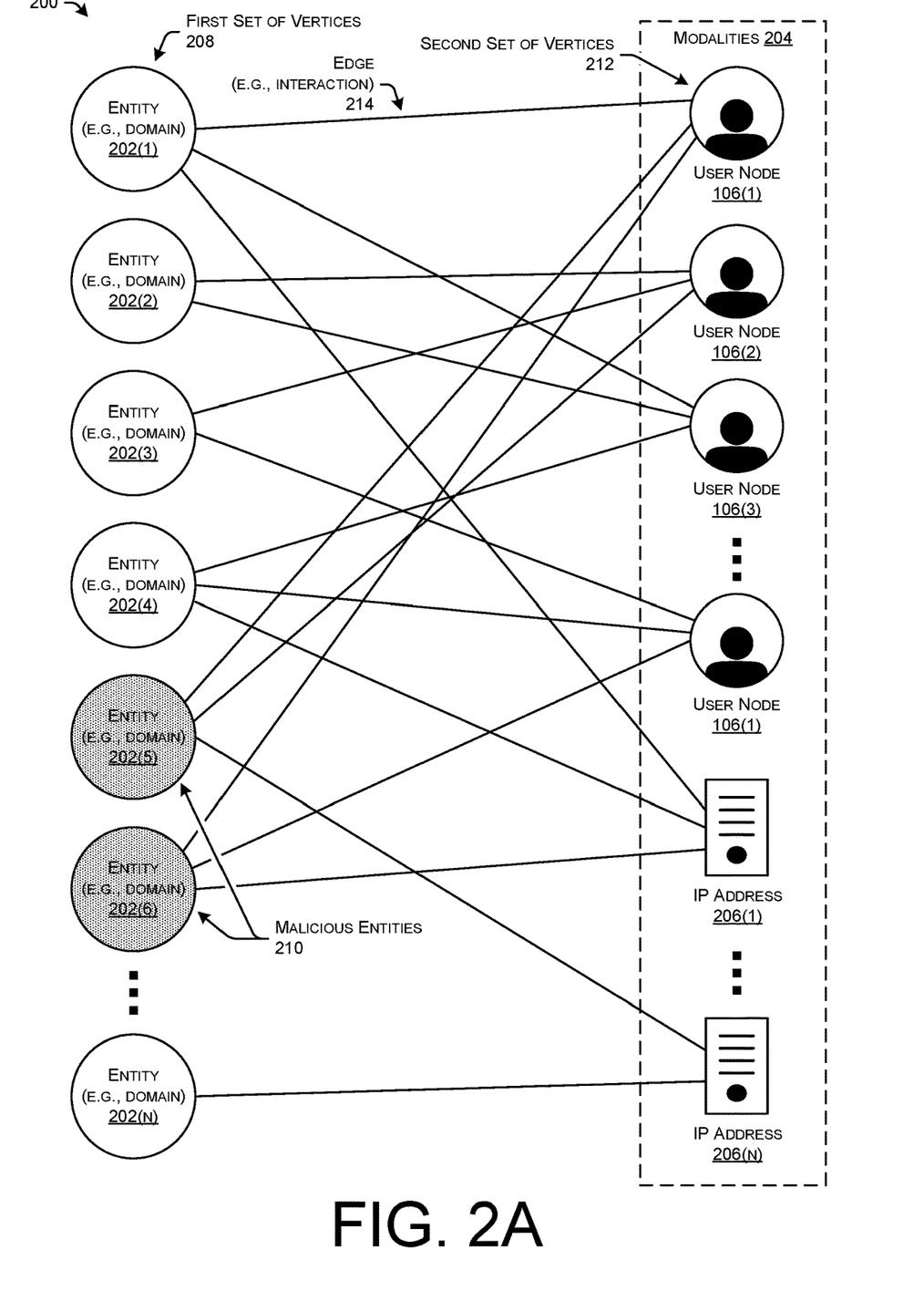
FIG. 2A illustrates an example bipartite graph that may be used as an input for some of the various threat detection techniques and algorithms described herein.

FIG. 2A illustrates an example bipartite graph 200 that may be used as an input for some of the various threat detection techniques and algorithms described herein. For instance, the bipartite graph 200 may be generated by the graph component 122 based at least in part on the telemetry data 130 associated with the network security system 112.

In some examples, the bipartite graph 200 may describe or otherwise be indicative of interactions between one or more entities 202(1)-202(N) (hereinafter referred to collectively as "entities 202") and one or more modalities 204, which may include one or more user nodes 106(1)-106(N) (hereinafter referred to collectively as "user nodes 106") and/or one or more IP addresses 206(1)-206(N) (hereinafter referred to collectively as "IP addresses 206"). The IP addresses 206 may correspond with the computing resources 108, in some instances. In FIG. 2A, as well as the other figures herein, "N" may represent any number greater than or equal to one.

In some examples, the bipartite graph 200 may include a first set of vertices 208 representing the entities 202 (e.g., domains). The first set of vertices 208 may, in some cases, include both candidate entities and known, malicious entities 210. Additionally, the bipartite graph 200 may include a second set of vertices 212 representing the modalities 204.

The bipartite graph 200 may also include multiple edges 214 connecting individual vertices of the first set of vertices 208 with respective vertices of the second set of vertices 212. In some instances, the edges 214 may represent current or prior interactions between the entities 202 and the modalities 204. For instance, the edge 214 between the entity 202(1) and the user node 106(1) may be indicative that a user associated with the user node 106(1) interacted with the entity 202(1) (e.g., the user visited the domain).

Figure 2B:
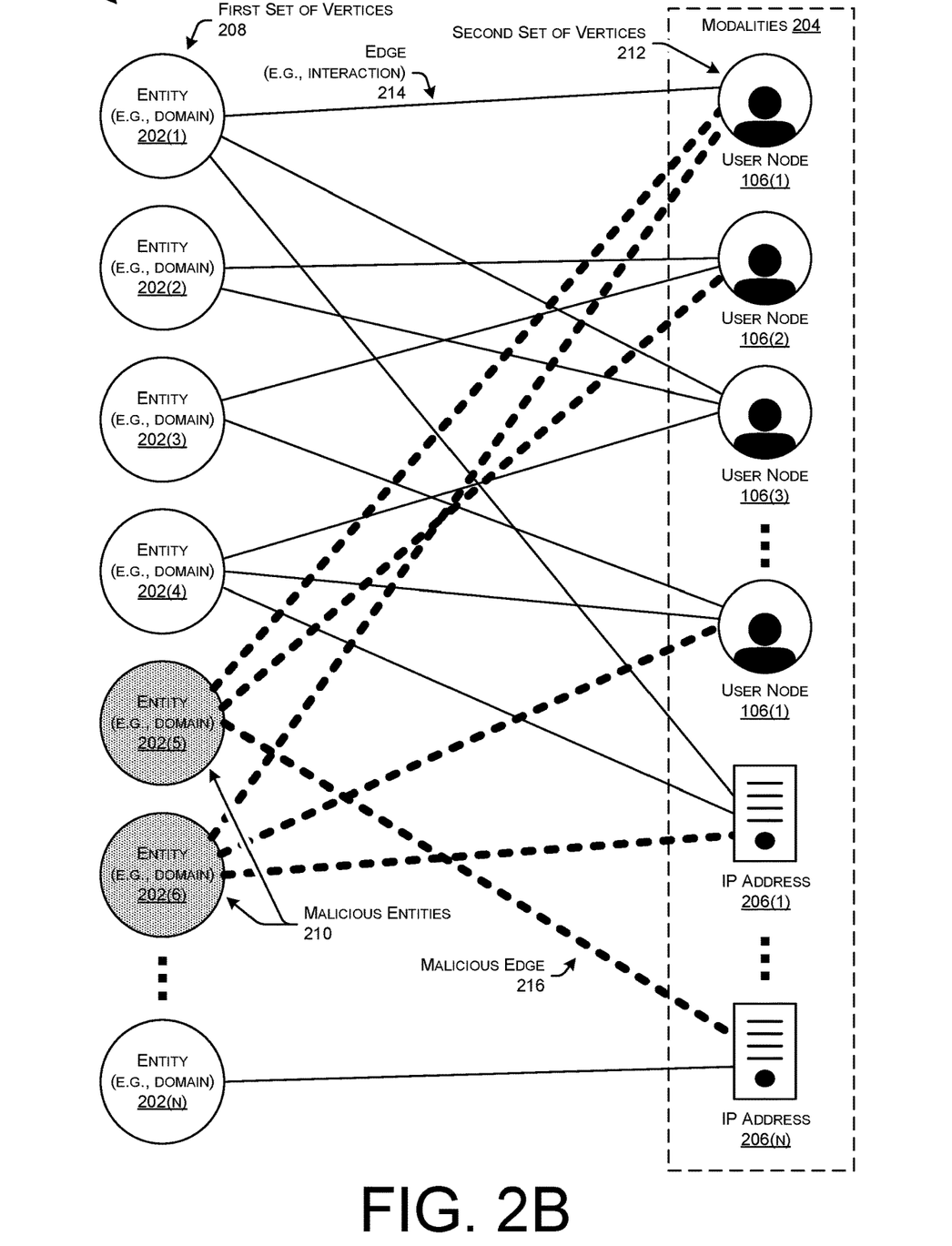
FIG. 2B illustrates the example bipartite graph in which multiple malicious edges have been identified for determining a maliciousness score associated with a modality.

FIG. 2B illustrates the example bipartite graph 200 in which multiple malicious edges 216 have been identified for determining a maliciousness score associated with a modality 204. A malicious edge 216 may be indicative that a modality 204 is interacting with a known, malicious entity 210. In some examples, the threat identification component 124 may determine which edges 214 of the bipartite graph are malicious edges 216.

In some examples, a value of the maliciousness score associated with a modality 204 may be equal to the number of malicious edges 216 connected to a modality 204 vertex, divided by the total number of edges (both normal edges 214 and malicious edges 216) connected to the modality 204 vertex. For example, the maliciousness score value for the user node 106(1) is equal to ⅔ (or 0.66) because the user node 106(1) is connected to two malicious edges 216 and one normal edge 214. Similarly, the maliciousness score values for the other modalities 204 would be as follows: user node 106(2)=⅓ (or 0.33); user node 106(3)=0/3 (or 0.0); IP address 206(1)=⅓ (or 0.33); and IP address 206(N)=½ (or 0.5).

In some examples, the maliciousness score value associated with an entity 202 may be equal to an aggregation or average of the maliciousness scores associated with all of the modalities 204 to which the entity 202 is connected by an edge 214 and/or malicious edge 216. For instance, the value of the maliciousness score for the entity 202(1) would be equal to an aggregation or average of the maliciousness scores for the user node 106(1), the user node 106(3), and the IP address 206(1). This maliciousness score value for the entity 202(1) may be calculated as follows:

$$\frac{\frac{2}{3} + 0 + \frac{1}{3}}{3} = \frac{1}{3} = 0.33$$

where ⅔ corresponds with the user node 106(1), 0 corresponds with the user node 106(3), and ⅓ corresponds with the IP address 206(1). Similarly, the maliciousness score values for the other entities 202 would be as follows: entity 202(2)=⅙ (or 0.167); entity 202(3)=⅓ (or 0.33); entity 202(4)=⅔ (or 0.22); and entity 202(N)=½ (or 0.5). Other aggregations than calculating the mean in this example may be used.

Figure 2C:
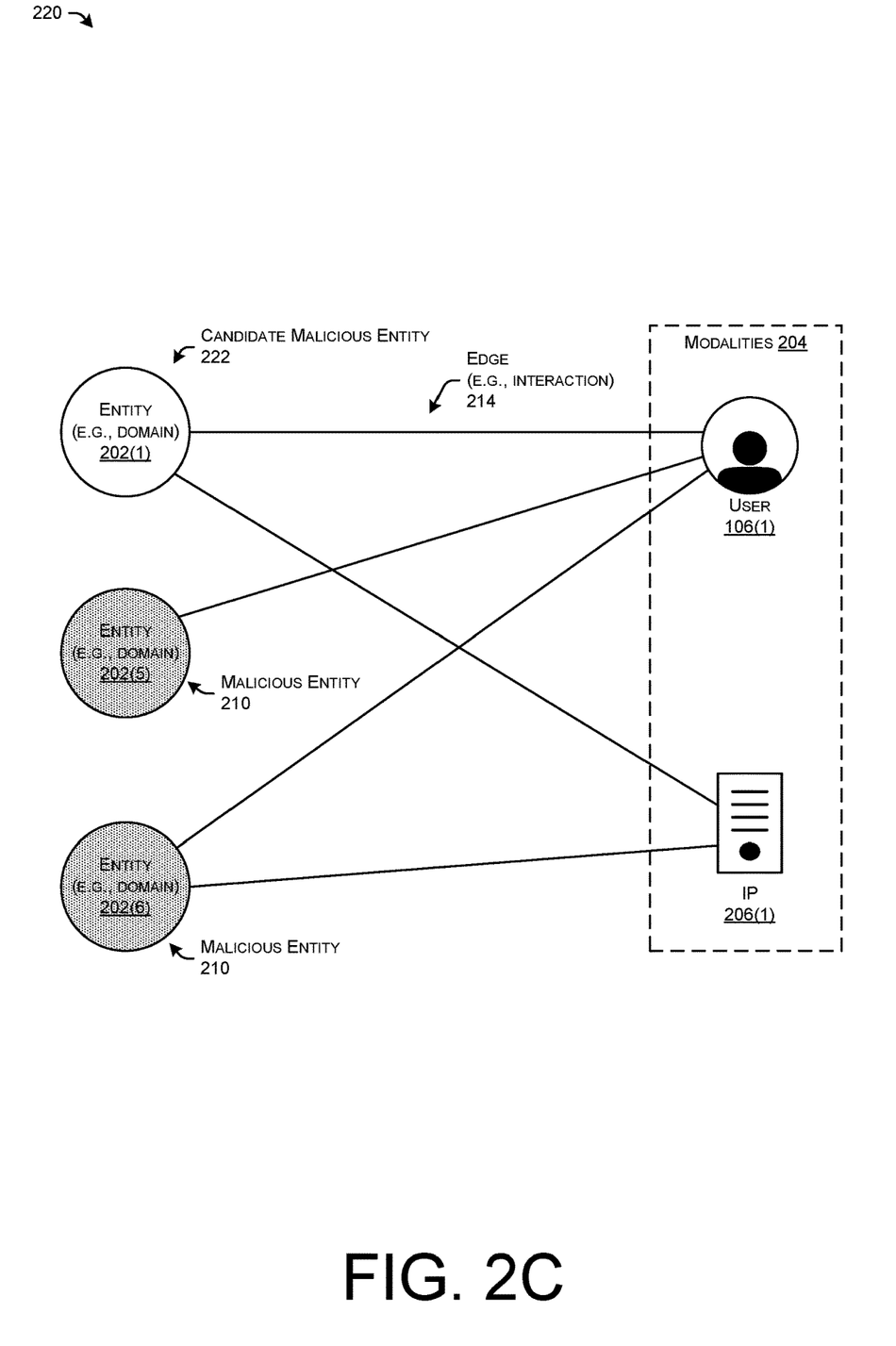
FIG. 2C illustrates an example subgraph of the bipartite graph that indicates respective modalities connecting a candidate malicious entity to a known, malicious entity.

FIG. 2C illustrates an example subgraph 220 of the bipartite graph 200 that indicates respective modalities 204 connecting a candidate malicious entity 222 to a known, malicious entity 224. In the example subgraph 220, the entity 202(1) has been identified as a candidate malicious entity 222 based at least in part on the value of its maliciousness score exceeding a threshold value. The subgraph 220 may include all of the edges 214 connecting the entity 202(1) to modalities 204 that are also connected to malicious entities 210. Although not illustrated, in some examples, the subgraph 220 may further include edges 214 connecting the entity 202(1) to modalities 204 that are not connected to malicious entities 210. In some examples, the subgraph 220 may be included in a report that is sent to a threat analyst associated with the trusted network 102.

Figure 3:
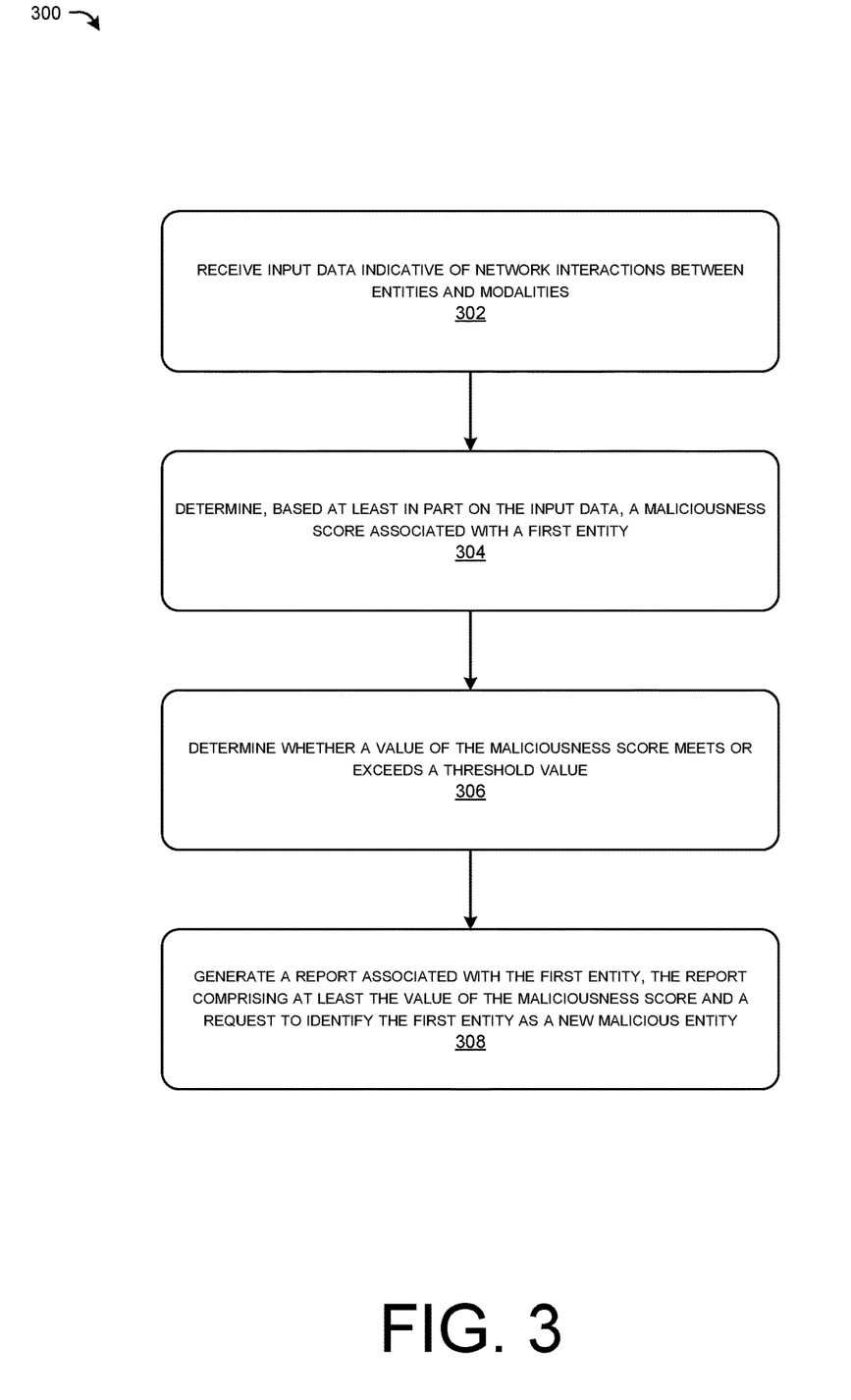
FIG. 3 is a flow diagram illustrating an example method associated with the threat detection techniques described herein.

FIG. 3 is a flow diagram illustrating an example method 300 associated with the threat detection techniques described herein. The logical operations described herein with respect to FIG. 3 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 3 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

The method 300 begins at operation 302, which includes receiving input data indicative of network interactions between entities and modalities. For instance, the threat identification component 124 may receive the input data from the graph component 122. In some examples, the input data may be a bipartite graph 200 that is indicative of the interactions between the entities and the modalities. The bipartite graph may be generated or otherwise determined by the graph component 122 based at least in part on telemetry data 130 associated with the network security system 112. In some examples, the bipartite graph may include a first set of vertices representing the entities (including both candidate entities and known, malicious entities), a second set of vertices representing the modalities, and multiple edges connecting individual vertices of the first set of vertices with respective vertices of the second set of vertices. In some instances, the multiple edges may represent current or prior interactions between the entities and the modalities.

At operation 304, the method 300 includes determining, based at least in part on the input data, a maliciousness score associated with a first entity. For instance, the threat identification component 124 may determine the maliciousness score associated with the first entity 202(1). In some examples, the threat identification component 124 may determine maliciousness scores for multiple entities. In some examples, a value of the maliciousness score for the first entity may be based at least in part on a number of the modalities 204 that are interacting with the first entity, and which are also interacting with one or more known, malicious entities 210. In some examples, respective maliciousness scores associated with each one of the modalities 204 may be determined. In such examples, for each of the respective modalities, a value of their respective maliciousness score may be equal to a number of known, malicious entities that the respective modality is interacting with divided by a total number of the entities that the respective modality is interacting with. By way of example, and not limitation, if a first modality is interacting with a total of four entities, and one of the four entities is a known, malicious entity, then the value of the maliciousness score for that first modality may be equal to ¼ (or 0.25). Additionally, in some examples, the maliciousness score associated with the first entity may be determined based at least in part on an aggregation of the respective maliciousness scores associated with each one of the modalities that are interacting with the specific candidate entity. Continuing the above example, if the first entity is interacting with the first modality (maliciousness score value of ¼ (or 0.25) and with a second modality that has a maliciousness score value of ½ (or 0.5), then the maliciousness score value for the specific candidate entity may be equal to the average of ¼ and ½ (which is equal to ⅜ (or 0.375).

At operation 306, the method 300 includes determining whether a value of the maliciousness score meets or exceeds a threshold value. For instance, the threat evaluation component 126 may determine whether the value of the maliciousness score meets or exceeds the threshold value. In some instances, the threshold value may be a specific value set by a threat analyst, such as 0.3, 0.4, 0.6, etc. In some examples a maliciousness rank of the first entity relative to other candidate entities may be determined based at least in part on the value of the maliciousness score. Additionally, whether the value of the maliciousness score exceeds the threshold value may be based at least in part on the maliciousness rank of the first entity. For instance, if the first entity is within a top ten of candidate entities with a highest maliciousness ranking, then the threshold value may be determined as the maliciousness score value corresponding to the tenth ranked entity.

At operation 308, the method 300 includes generating a report associated with the first entity, the report comprising at least the value of the maliciousness score and a request to identify (e.g., classify, label, categorize, etc.) the first entity as a new malicious entity. For instance, the report component 128 may generate the report associated with the first entity 202(1). In some examples, the report associated with the first entity may be generated based at least in part on the value of the maliciousness score meeting or exceeding the threshold value. In some examples, the report may be sent to a threat analyst associated with the trusted network 102. In some examples, the report may include the value of the maliciousness score associated with the first entity and a request to identify (e.g., classify, label, categorize, etc.) the first entity as a new malicious entity. Additionally, or alternatively, the report may include an indication of the one or more malicious entities that the modalities have interacted with in addition to the first entity. Additionally, or alternatively, the report further may include a maliciousness vector associated with the first entity, the maliciousness vector including respective maliciousness scores associated with each one of the modalities that are interacting with the first entity. In addition, or in the alternative, to the examples above, the report may also include one or more of: (i) a maliciousness score (e.g., reputation) for each modality (e.g., IPs, files, users, etc.) interacting with the first entity; (ii) an aggregated score over the maliciousness vector (i.e., over different data sources) for each entity (e.g., domain); (iii) an ordering of both entities and modalities by their maliciousness score; and/or (iv) supporting information providing the reasoning for the maliciousness score, which may contain a subgraph of the bipartite graph indicating the neighbors for each entity or modality node and/or full information for the maliciousness score computation for a given candidate entity.

Figure 4:
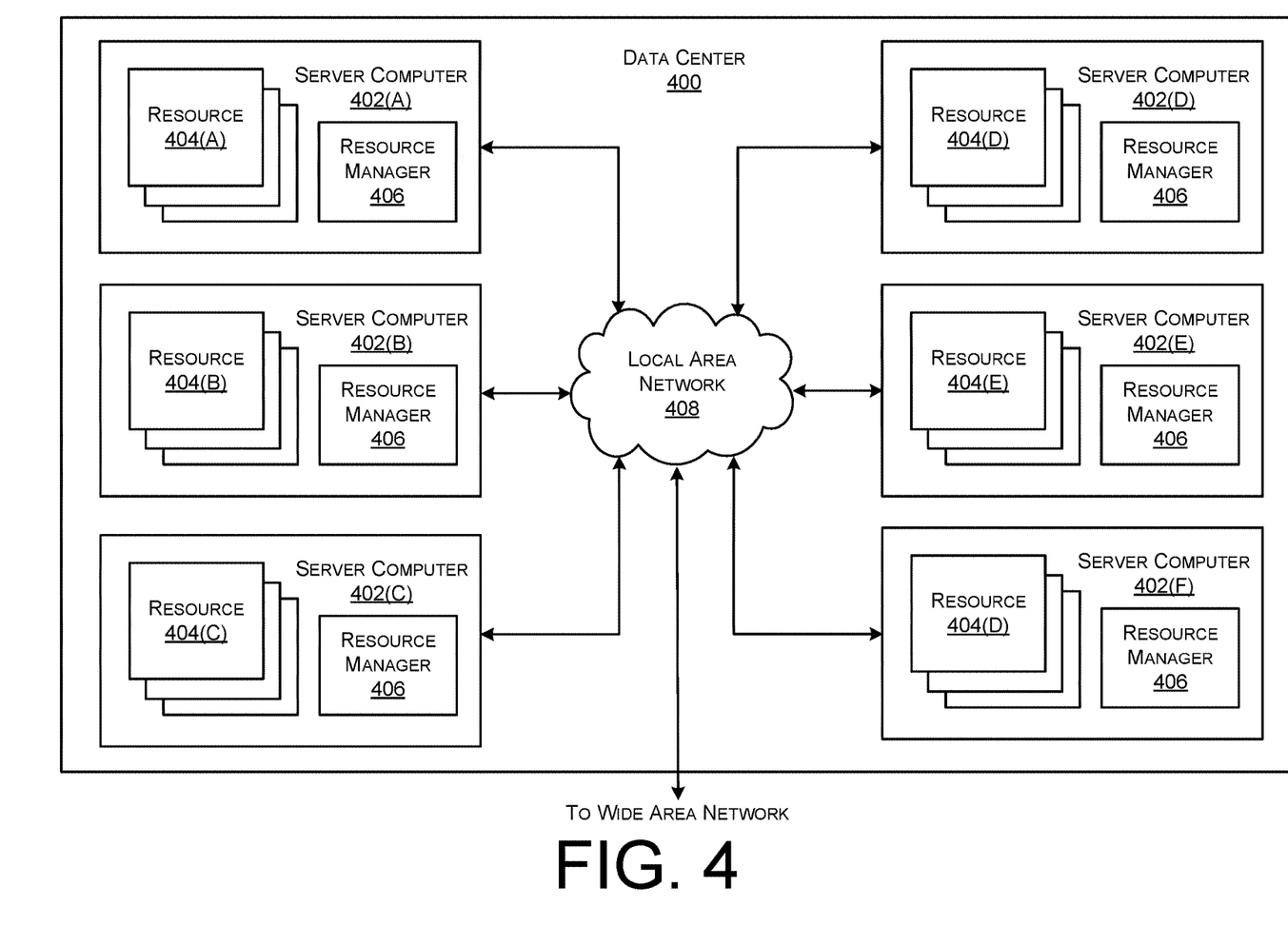
FIG. 4 is a computing system diagram illustrating an example configuration of a data center that can be utilized to implement aspects of the technologies disclosed herein.

FIG. 4 is a computing system diagram illustrating an example configuration of a data center 400 that can be utilized to implement aspects of the technologies disclosed herein. The example data center 400 shown in FIG. 4 includes several server computers 402A-402F (which might be referred to herein singularly as "a server computer 402" or in the plural as "the server computers 402") for providing computing resources. In some examples, the resources and/or server computers 402 may include, or correspond to, any type of networked device or node described herein. Although described as servers, the server computers 402 may comprise any type of networked device, such as servers, switches, routers, hubs, bridges, gateways, modems, repeaters, access points, etc.

The server computers 402 can be standard tower, rack-mount, or blade server computers configured appropriately for providing computing resources. In some examples, the server computers 402 may provide computing resources 404 including data processing resources such as VM instances or hardware computing systems, database clusters, computing clusters, storage clusters, data storage resources, database resources, networking resources, security, packet inspection, and others. Some of the servers 402 can also be configured to execute a resource manager 406 capable of instantiating and/or managing the computing resources. In the case of VM instances, for example, the resource manager 406 can be a hypervisor or another type of program configured to enable the execution of multiple VM instances on a single server computer 402. Server computers 402 in the data center 400 can also be configured to provide network services and other types of services.

In the example data center 400 shown in FIG. 4, an appropriate local area network (LAN) 408 is also utilized to interconnect the server computers 402A-402F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 400, between each of the server computers 402A-402F in each data center 400, and, potentially, between computing resources in each of the server computers 402. It should be appreciated that the configuration of the data center 400 described with reference to FIG. 4 is merely illustrative and that other implementations can be utilized.

In some examples, the server computers 402 may each execute one or more application containers and/or virtual machines to perform techniques described herein. In some instances, the data center 400 may provide computing resources, like application containers, VM instances, and storage, on a permanent or an as-needed basis. Among other types of functionality, the computing resources provided by a cloud computing network may be utilized to implement the various services and techniques described above. The computing resources 404 provided by the cloud computing network can include various types of computing resources, such as data processing resources like application containers and VM instances, data storage resources, networking resources, data communication resources, network services, and the like.

Each type of computing resource 404 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 404 not mentioned specifically herein.

The computing resources 404 provided by a cloud computing network may be enabled in one embodiment by one or more data centers 400 (which might be referred to herein singularly as "a data center 400" or in the plural as "the data centers 400"). The data centers 400 are facilities utilized to house and operate computer systems and associated components. The data centers 400 typically include redundant and backup power, communications, cooling, and security systems. The data centers 400 can also be located in geographically disparate locations. One illustrative embodiment for a data center 400 that can be utilized to implement the technologies disclosed herein will be described below with regard to FIG. 5.

Figure 5:
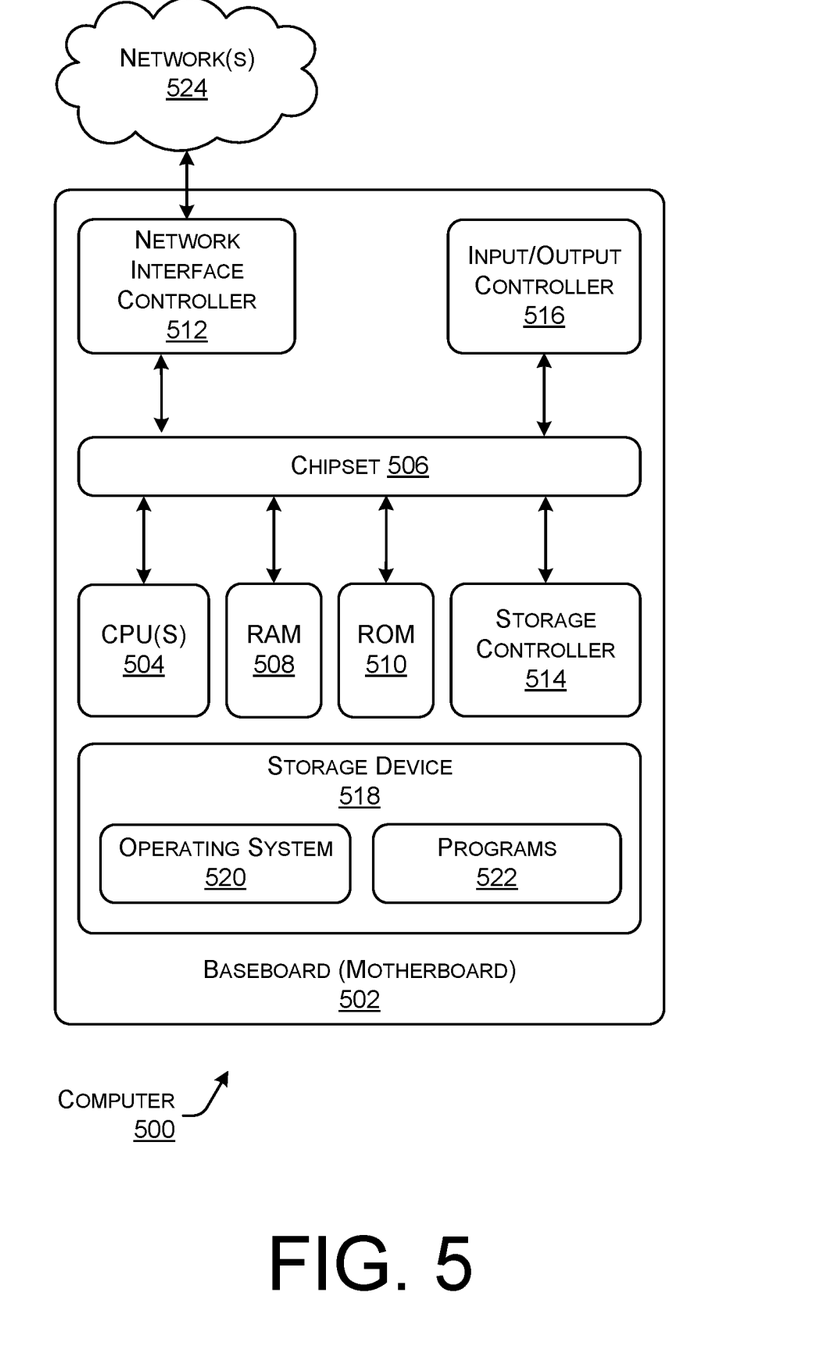
FIG. 5 is a computer architecture diagram showing an illustrative computer hardware architecture for implementing a computing device that can be utilized to implement aspects of the various technologies presented herein.

FIG. 5 is a computer architecture diagram showing an illustrative computer hardware architecture for implementing a computing device that can be utilized to implement aspects of the various technologies presented herein. The computer architecture shown in FIG. 5 illustrates a conventional server computer, network node, router, workstation, desktop computer, laptop, tablet, network appliance, e-reader, smartphone, load balancer, or other computing device, and can be utilized to execute any of the software components presented herein.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as the network(s) 524. The chipset 506 can include functionality for providing network connectivity through a NIC 512, such as a gigabit Ethernet adapter. The NIC 512 is capable of connecting the computer 500 to other computing devices over the network(s) 524. It should be appreciated that multiple NICs 512 can be present in the computer 500, connecting the computer to other types of networks and remote computer systems. In some examples, the NIC 512 may be configured to perform at least some of the techniques described herein.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by the architecture 100 and or any components included therein, may be supported by one or more devices similar to computer 500. Stated otherwise, some or all of the operations performed by the architecture 100, and or any components included therein, may be performed by one or more computer devices 500 operating in a scalable arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes and functionality described above with regard to FIGS. 1-3, and herein. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

The computer 500 may include one or more hardware processors (processors) configured to execute one or more stored instructions. The processor(s) may comprise one or more cores. Further, the computer 500 may include one or more network interfaces configured to provide communications between the computer 500 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 522 may comprise any type of programs or processes to perform the techniques described in this disclosure for identifying malicious actors across datasets of different origin, including convicting malicious network traffic and identifying command-and-control infrastructure associated with newly detected malware even if no direct communication between binaries and domains is observed.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   receiving input data indicative of network interactions between entities and modalities, wherein the modalities are associated with a trusted network and access the entities via one or more untrusted network;
   determining, based at least in part on the input data, a maliciousness score associated with a first entity, wherein a value of the maliciousness score is based at least in part on a number of the modalities that are interacting with both the first entity and one or more malicious entities;
   determining whether the value of the maliciousness score exceeds a threshold value; and
   based at least in part on the value of the maliciousness score exceeding the threshold value, generating a report associated with the first entity, the report comprising at least the value of the maliciousness score and a request to identify the first entity as a new malicious entity.

2. The method of claim 1, wherein the first entity is a first domain and the one or more malicious entities are one or more malicious domains.

3. The method of claim 1, wherein the modalities comprise one or more of user nodes or internet protocol (IP) addresses.

4. The method of claim 1, further comprising determining, based at least in part on the value of the maliciousness score, a maliciousness rank of the first entity relative to other entities, wherein determining whether the value of the maliciousness score exceeds the threshold value is based at least in part on the maliciousness rank.

5. The method of claim 1, further comprising:
   determining, based at least in part on the input data, respective maliciousness scores associated with each one of the modalities that are interacting with the first entity, wherein values of the respective maliciousness scores are proportional to, for a respective modality, a number of malicious entities that the respective modality is interacting with divided by a total number of the entities that the respective modality is interacting with, wherein the value of the maliciousness score is further based at least in part on the respective maliciousness scores associated with each one of the modalities.

6. The method of claim 5, wherein the maliciousness score associated with the first entity is determined based at least in part on an aggregation of the respective maliciousness scores associated with each one of the modalities that are interacting with the first entity.

7. The method of claim 1, wherein the input data is a bipartite graph determined based at least in part on telemetry data associated with an intrusion detection system.

8. The method of claim 7, wherein the bipartite graph comprises:
   a first set of vertices representing the entities, the first set of vertices including at least a first vertex corresponding with the first entity and one or more vertices corresponding with the one or more malicious entities;
   a second set of vertices representing the modalities; and
   multiple edges connecting individual vertices of the first set of vertices with respective vertices of the second set of vertices, the multiple edges representing interactions between the entities and the modalities.

9. The method of claim 1, wherein the report further comprises an indication of the one or more malicious entities that the number of the modalities have interacted with.

10. The method of claim 9, wherein the report further comprises a maliciousness vector associated with the first entity, the maliciousness vector including respective maliciousness scores associated with each one of the modalities that are interacting with the first entity.

11. A system comprising:
    one or more hardware processors; and
    one or more non-transitory computer-readable media storing instructions that, when executed, cause the one or more hardware processors to perform operations comprising:
    receiving input data indicative of network interactions between entities and modalities, wherein the modalities are associated with a trusted network and access the entities via one or more untrusted network;
    determining, based at least in part on the input data, a maliciousness score associated with a first entity, wherein a value of the maliciousness score is based at least in part on a number of the modalities that are interacting with the first entity and also interacting with one or more malicious entities;
    determining whether the value of the maliciousness score exceeds a threshold value; and
    based at least in part on the value of the maliciousness score exceeding the threshold value, generating a report associated with the first entity, the report comprising at least the value of the maliciousness score and a request to identify the first entity as a new malicious entity.

12. The system of claim 11, wherein the first entity is a first domain, the one or more malicious entities are one or more malicious domains, and the modalities comprise one or more of user nodes or internet protocol (IP) addresses.

13. The system of claim 11, the operations further comprising determining, based at least in part on the value of the maliciousness score, a maliciousness rank of the first entity relative to other entities, wherein determining whether the value of the maliciousness score exceeds the threshold value is based at least in part on the maliciousness rank.

14. The system of claim 11, the operations further comprising determining, based at least in part on the input data, respective maliciousness scores associated with each one of the modalities that are interacting with the first entity, wherein values of the respective maliciousness scores are proportional to, for a respective modality, a number of malicious entities that the respective modality is interacting with divided by a total number of the entities that the respective modality is interacting with.

15. The system of claim 11, wherein the input data is a bipartite graph determined based at least in part on telemetry data associated with an intrusion detection system, the bipartite graph comprising:
- a first set of vertices representing the entities, the first set of vertices including at least a first vertex corresponding with the first entity and one or more vertices corresponding with the one or more malicious entities;
- a second set of vertices representing the modalities; and
- multiple edges connecting individual vertices of the first set of vertices with respective vertices of the second set of vertices, the multiple edges representing interactions between the entities and the modalities.

16. One or more non-transitory computer-readable media storing instructions that, when executed, cause one or more computing devices to perform operations comprising:
- receiving input data indicative of network interactions between entities and modalities, wherein the modalities are associated with a trusted network and access the entities via one or more untrusted network;
- determining, based at least in part on the input data, a maliciousness score associated with a first entity, wherein a value of the maliciousness score is based at least in part on a number of the modalities that are interacting with the first entity and also interacting with one or more malicious entities;
- determining whether the value of the maliciousness score exceeds a threshold value; and
- based at least in part on the value of the maliciousness score exceeding the threshold value, generating, for display, a report associated with the first entity, the report comprising at least the value of the maliciousness score and a request to identify the first entity as a new malicious entity.

17. The one or more non-transitory computer-readable media of claim 16, wherein the first entity is a first domain, the one or more malicious entities are one or more known malicious domains, and the modalities comprise one or more of user nodes or internet protocol (IP) addresses.

18. The one or more non-transitory computer-readable media of claim 16, the operations further comprising determining, based at least in part on the value of the maliciousness score, a maliciousness rank of the first entity relative to other entities, wherein determining whether the value of the maliciousness score exceeds the threshold value is based at least in part on the maliciousness rank.

19. The one or more non-transitory computer-readable media of claim 16, the operations further comprising determining, based at least in part on the input data, respective maliciousness scores associated with each one of the number of the modalities that are interacting with the first entity, wherein values of the respective maliciousness scores are proportional to, for a respective modality, a number of malicious entities that the respective modality is interacting with divided by a total number of the entities that the respective modality is interacting with.

20. The one or more non-transitory computer-readable media of claim 16, wherein the input data is a bipartite graph determined based at least in part on telemetry data associated with an intrusion detection system, the bipartite graph comprising:
- a first set of vertices representing the entities, the first set of vertices including at least a first vertex corresponding with the first entity and one or more vertices corresponding with the one or more malicious entities;
- a second set of vertices representing the modalities; and
- multiple edges connecting individual vertices of the first set of vertices with respective vertices of the second set of vertices, the multiple edges representing interactions between the entities and the modalities.

* * * * *